Patented Nov. 2, 1937

2,098,059

UNITED STATES PATENT OFFICE 2,098,059

TREATMENT OF HYDROCARBON OILS

Jacque C. Morrell, Chicago, Ill., assignor, by mesne assignments, to Universal Oil Products Company, Chicago, Ill., a corporation of Delaware No Drawing. Application February 18, 1932, Serial No. 593,875. Renewed January 2, 1936

2 Claims. (Cl. 196—36)

This invention relates more particularly to the treatment of low boiling cracked hydrocarbons containing substantial percentages of gasoline, though similar fractions from other sources may also be treated such as straight run gasolines and those produced by re-running primary cracked naphthas.

In a more specific sense the invention has reference to the treatment of such hydrocarbons while in heated vaporous condition by a process adapted to remove color and to materially reduce the amount of gum-forming constituents as well as to effect also substantial reduction in sulfur content.

The need of a method of treatment which could be applied to cracked hydrocarbon oil vapors and which would be selective in removing only the undesirable constituents such as the di and tri olefins and the more reactive sulfur compounds has been felt for a long time and many methods have been proposed for effecting these ends involving the use of a large number of chemical treating reagents under special conditions of operation.

In one specific embodiment the invention comprises treating hydrocarbon oils, particularly cracked hydrocarbon oils, in heated vaporous condition with hydrochloric acid and aldehydes in the presence of solid contact materials of a catalytic or adsorbent character.

The hydrochloric acid necessary for the reactions may be introduced as an aqueous solution or as a gas, preferably in the presence of steam, the amount used being determined by the nature of the vapors undergoing treatment with respect to the proportions of gum-forming and sulfur-containing compounds therein present, the particular contact materials employed, the temperature and pressure and other factors of operation.

Various aldehydes may be used in conjunction with hydrochloric acid such as, for example, the aldehydes shown in the following table which gives the name of five well known and readily available compounds and their boiling points.

| Compound | B. P. °F. |
|---|---|
| Formaldehyde | −7 |
| Acetaldehyde | +69 |
| Propionaldehyde | +119 |
| n-Butyric aldehyde | +163 |
| Furfural | +322 |

The list of aldehydes given is merely illustrative and is given primarily to show that aldehydes of varying chemical structure and molecular weight and varying boiling points may be employed, the results obtained with individual compounds or their combinations being more or less distinctive and not exactly equivalent.

The contact materials which may be employed are preferably those which possess definite catalytic or adsorbent properties in connection with the reactions involved. They may comprise:

(1) Metals.
(2) Metal oxides.
(3) Metal salts.
(4) Adsorbent materials.

Various metals may be employed in a proper state of subdivision to insure their action as catalysts, such metals comprising, for example, iron, nickel, cobalt, copper, zinc, tungsten, vanadium, molybdenum, etc., and such others as may be found effective. Similarly, the oxides of metals may be employed and certain of their salts which have proper stability and the invention further comprises the use of mixtures of metals and their compounds though any specific substances or mixtures of substances will have its characteristic influence upon the reactions and not be exactly equivalent to other materials containing the metals and compounds in different proportions.

The adsorbent materials which may be used comprise materials of a non-metallic nature such as fuller's earth, clays, bentonite, bauxite, activated carbon, et cetera, which may be used singly or in suitable combinations or in combination with the metals or metal compounds mentioned above. These substances may act as accelerators of the reactions due to their inherent adsorptive or catalytic capacities or may act more as spacing or supporting vehicles for the more active metallic catalysts which may be employed.

The use of relatively inert and non-adsorbent materials as spacing or carrying agents is also comprised in connection with the materials already mentioned. The materials included in this category are crushed fire-brick, sand, gravel, silica and porcelain fragments, etc.

It is to be understood that the various materials are not strictly equivalent in regard to results obtained.

The mechanism of the reactions involved in treatments characteristic of the invention appear to be of a compound nature, effecting on the one hand the polymerization and condensation of highly unsaturated hydrocarbons to form high molecular weight aggregates which are readily separable from the residual treated vapors in subsequent fractionation and, on the other hand, the formation of high boiling sulfur compounds similarly separable by fractionation, such as the mercaptals. These latter compounds are formed by the mutual interaction of hydrochloric acid, aldehydes, and mercaptans, and while these compounds are typical, it is probable that high boiling sulfur compounds of similar character are formed from other sulfur compounds that may be present in the vapors, so that the sulfur content of the vapors is reduced to a considerable extent. Furthermore, when appreciable quantities of hydrogen sulfide are present in the vapor mixtures, the reactions will result in the formation of trithioaldehydes, thus eliminating this gas as a source of difficulty in subsequent treatments which may be conducted upon the vapors.

It is presumed that when hydrochloric acid and metals or metal compounds are used that polymerization reactions may also be brought about to some extent by metal chlorides produced by the action of hydrochloric acid upon the metals or metal compounds present, these chlorides being intermediate or transient products and being decomposed again at least to a considerable extent shortly after their formation though the exact mechanism of the reactions is not definitely known. It is recognized that aldehydes may generally have a reducing effect which in some cases may be antagonistic to the polymerization of highly unsaturated hydrocarbons and to overcome this tendency it may be necessary to add small amounts of oxidizing gases such as air, oxygen, ozone, et cetera.

When materials of an adsorbent character are used alone, that is, without admixture of metals or metal compounds, the exact course of the reactions may be somewhat different than when metals or their compounds are used. However, experience may show that in particular cases where relatively large percentages of polymerizable materials are present in the vapors undergoing treatment that the use of adsorbent materials alone is adequate to produce the desired results.

The process admits of ready and simple application to vapor phase treatments in types of equipment already known to the oil industry. Treatments may be conducted in vertical cylindrical treating towers containing filling or spacing material of some character upon which metals or mixtures of metals and their compounds chosen to act as catalysts may be deposited, or in which adsorbent materials such as fuller's earth are used. The hydrochloric acid may be injected into the stream of vapors entering the tower along with suitable amounts of an aldehyde or a mixture of aldehydes and the vaporous mixture contacted with the contact mass for a suitable period of time to insure completion of desired reactions. Treatments may be conducted by passing vapors either in an upward or downward direction whichever may prove the most satisfactory and in general the process may be carried out in any type of treating equipment without departing from the generally comprehensive scope of the invention. A jet mixer may also be used to advantage in the process.

The treatment may be used as a single treatment or in combination with other more or less well known treatments either liquid or vapor phase. For example, the vapors prior to the application of the process may be contacted with fuller's earth, and other materials of an adsorbent nature, and the treatment itself may be followed by the use of mist-gathering devices, settling chambers, filters and other chemical treatments such as, for example, the neutralizing of any excess of volatile acid, and furthermore the condensed distillates may be subjected to a light final treatment such as sweetening with plumbite solutions or neutralization with aqueous caustic soda.

The process may be conducted under various temperature and pressure conditions and is readily applied to vapors as they arise from the fractionators of cracking plants or primary straight run or rerunning units. The usual range of temperature employed may be stated to be between 250 and 600° F., since this range covers approximately the mean boiling point of gasoline vapors produced under pressures from atmospheric to 400 or 500 pounds per square inch and thus covers the conditions obtaining in the fractionators of cracking plants. However, experimental work may at times dictate the use of lower temperatures corresponding to those obtainable when subatmospheric pressures are used in which case temperatures as low as 100 to 150° F. may be used with corresponding variations in the results obtained.

The amounts and proportions of hydrochloric acid and aldehydes will vary markedly on account of the extremely variable character of hydrocarbon vapors from different sources which may be treated, though in general it may be stated that relatively minor amounts are used such as from one to five pounds per barrel of each reagent unless hydrocarbon vapors produced by relatively low pressure and high temperature cracking processes are to be treated. Such vapors will contain large amounts of gum-forming compounds and may require more extensive treatment.

As an example of results obtainable by the use of the process on a particular type of hydrocarbon oil vapors, a case may be considered in which the vapors were produced by the cracking of a Mid-Continent fuel oil. By passing such vapors through a vertical cylindrical treater partly filled with copper turnings, after the previous addition of hydrochloric acid in an amount equivalent to about one pound per barrel of finished gasoline and formaldehyde in a similar amount by weight, the vapors may be refined as shown by comparison of properties of the "untreated" and "treated" gasolines in the following table. The untreated table shown the properties of the gasoline produced by simple fractionation of the vapors to produce the desired end point and the treated column shows the corresponding properties of the gasoline finally produced after the vapor phase treatment described and the final fractionation, the yield being substantially the same in both cases:

| | Untreated | Treated |
|---|---|---|
| Gravity °A. P. I. | 53.6 | 53.9 |
| End point °F | 405 | 403 |
| Color Saybolt | 10 | 30 |
| Color after 4 hours exposure to sunlight | Light yellow | 25 |
| Mg. of gum by copper dish | 325 | 20 |
| Total sulfur percent | 0.31 | 0.10 |
| Octane number | 73 | 74 |

It will be observed from the preceding results that the gum-forming constituents have been notably reduced, and that the sulfur content has been brought to a point meeting the usual 0.10% specification. The amounts of reagents used are small and the contact mass remains effective over long periods of time so that the overall efficiency of the process is high.

Similarly, good results may be obtained by the use of hydrochloric acid in the presence of such contact materials as mixtures of ferric oxide and fuller's earth, with chlorides such as zinc chloride deposited in the pores or on the surface of fuller's earth or pumice stone or by the use of adsorbent materials alone such as clays, activated carbon, et cetera. Good results have been obtained in the treatment of cracked distillates containing relatively high percentages of sulphur, e. g. those of California, Oregon basin, Mexican and Venezuelan origin with respect to color and gum removal and sulphur reduction. However, the example of results given is sufficiently indicative of the value of the process, and it is not felt that further detail is necessary to a complete understanding of its nature and advantages.

I claim as my invention:

1. In a process for refining hydrocarbon oils to remove color and gum forming components and to reduce the sulphur content thereof, the improvement which comprises subjecting the said hydrocarbon oil while in heated vaporous condition to the action of hydrochloric acid in the presence of an aldehyde and a finely divided contact mass consisting of copper.

2. A method for refining cracked gasoline which comprises passing the gasoline in vapor form through a mass of finely divided heavy metal together with relatively minor amounts of hydrochloric acid and an aldehyde such as to separate sulphur compounds and objectionable olefins from the gasoline vapors, and then condensing and recovering the thus purified gasoline vapors.

JACQUE C. MORRELL.